United States Patent [19]

Engdahl et al.

[11] Patent Number: 5,171,998
[45] Date of Patent: Dec. 15, 1992

[54] GAMMA RAY IMAGING DETECTOR

[76] Inventors: John C. Engdahl, 1030 Penniman Ave., Plymouth, Mich. 48170; Glenn F. Knoll, 3891 Waldenwood, Ann Arbor, Mich. 48105

[21] Appl. No.: 537,624

[22] Filed: Jun. 14, 1990

[51] Int. Cl.[5] .......................................... G01T 1/202
[52] U.S. Cl. ........................ 250/363.02; 250/370.11
[58] Field of Search ...................... 250/363.02, 370.11

[56] References Cited

U.S. PATENT DOCUMENTS

| | | |
|---|---|---|
| 2,779,876 | 1/1957 | Tobias et al. |
| 3,011,057 | 11/1961 | Anger. |
| 3,732,419 | 5/1973 | Kulberg et al. |
| 3,745,345 | 7/1973 | Muehllehner. |
| 3,752,981 | 8/1973 | Jaszczak. |
| 3,784,819 | 1/1974 | Martone et al. |
| 3,984,689 | 10/1976 | Arseneau. |
| 4,058,728 | 11/1977 | Nickles. |
| 4,060,730 | 11/1977 | Zioni et al. |
| 4,061,919 | 12/1977 | Miller et al. |
| 4,071,762 | 1/1978 | Lange et al. |
| 4,100,413 | 7/1978 | Inbar et al. |
| 4,151,416 | 4/1979 | Richey et al. |
| 4,179,607 | 12/1979 | Lange et al. |
| 4,212,061 | 7/1980 | Knoll et al. |
| 4,223,388 | 9/1980 | Nishikawa et al. |
| 4,298,944 | 11/1981 | Stoub et al. |
| 4,316,257 | 2/1982 | Del Medico et al. |
| 4,672,207 | 6/1987 | Derenzo .......................... 250/363.02 |
| 4,883,966 | 11/1989 | Wong ............................. 250/363.02 |
| 4,940,901 | 7/1990 | Henry et al. .................... 250/370.11 |
| 4,945,243 | 7/1990 | Arques ........................... 250/370.11 |
| 4,982,095 | 1/1991 | Takahashi et al. ............... 250/370.11 |

OTHER PUBLICATIONS

Holl, Lorenz and Mageras, IEEE Trans. Nucl. Sci., vol. 35 No. 1, pp. 105-109 (1988).
Grassman, Lorenz and Moser, Nucl. Instr. and Meth. 228, pp. 323-326 (1985).
"Solid State Photodiodes for Scintillation Detectors" Technical Information document, SD-08/Nov. 1987, Hamamatsu Corp.
Bian, Dobbins and Mistry, Nucl. Instr. and Meth. A239, pp. 518-526 (1985).
E. Gatti, P. Rehak, Nucl. Instr. and Meth. 225 (1984) 608.
B. S. Avset et al., IEEE Trans. Nucl. Sci. 36 No. 1 (1989) 295.
P. Rehak, E. Gatti, et al., IEEE Trans. Nucl. Sci. vol. 36 No. 1 (1989) pp. 203-209.
"Photodetectors" pp. 743-789.
B. S. Avset et al., Nucl. Inst. and Meth. A288 (1990) pp. 131-136.

Primary Examiner—Janice A. Howell
Assistant Examiner—Richard Hanig
Attorney, Agent, or Firm—Gifford, Groh, Sprinkle, Patmore and Anderson

[57] ABSTRACT

A gamma ray imaging detector is disclosed for use in nuclear medicine applications. The imaging detector includes a single scintillation detector crystal which converts absorbed gamma rays into a plurality of scintillation photons. The scintillation detector crystal emits scintillation light with a spectral distribution for which most of the yield corresponds to wavelengths longer than 475 nanometers and is preferably a thallium doped cesium iodide crystal. An array of photodiodes are arranged along one side of the crystal to receive the scintillation photons which generate an electrical output signal proportional to the number of scintillation photons received by the photodiode. Diodes with low capacitance and electrical noise, such as silicon drift photodiodes, are employed so that the signal generated by the photodiode as a result of the received scintillation photons is readily detectable above the electrical noise from the photodiodes. Electronic circuitry is then utilized to determine the position of impingement and absorption of the gamma ray.

16 Claims, 1 Drawing Sheet

GAMMA RAY IMAGING DETECTOR

BACKGROUND OF THE INVENTION

I. Field of the Invention

The present invention relates generally to gamma ray imaging detectors and, more particularly, to such a detector for use in nuclear medicine applications.

II. Description of the Prior Art

In nuclear medicine, a radioactive isotope is introduced into the area of the body under examination. The radioactive isotope generates gamma rays at certain energies dependent upon the particular isotope used. For example, $^{99m}T_c$ generates gamma rays having an energy of 140 keV which is used in many nuclear medicine applications.

A collimator is then positioned between the object under study and the gamma ray imaging detector. The collimator typically comprises a lead plate having a plurality of parallel throughbores so that the gamma rays which pass through the collimator to the imaging detector are essentially parallel to each other.

A single sodium iodide crystal doped with thallium is contained within the housing for the image detector so that gamma rays passing through the collimator pass through an entrance window on the housing and impinge upon the crystal. A thin aluminum sheet across the entrance window hermetically encloses the crystal to protect it from moisture and the elements while a light reflective surface is positioned between the window and the crystal.

The sodium iodide crystal forms the scintillator material and has a typical thickness of between 0.25 and 0.50 inches. The crystal in turn is glued to a thick glass sheet known as the light pipe. The light pipe not only transmits photons which are generated by the crystal, but also mechanically supports the crystal.

In order to detect the emission of photons from the crystal, an array of photomultiplier tubes (PMT) are optically coupled to the light pipe assembly through an optical coupling compound or cement.

In operation, gamma rays generated by the source pass through the collimator, through the entrance window and are absorbed by the sodium iodide crystal. Only a very few gamma rays are absorbed by the aluminum sheet across the entrance window due to the low atomic number of aluminum. Conversely, the relatively high atomic number of the crystal makes it a good absorber of gamma rays.

Most of the gamma rays that are of interest to nuclear medicine fall within the energy range of 60-360 keV. These gamma rays interact with the crystal through the photoelectric effect in which a bound electron in the crystal absorbs the gamma ray. Upon doing so, the entire energy of the gamma ray is transferred into kinetic energy of the electron.

The electron which absorbs the energy of the incoming gamma ray transfers this energy to adjacent electrons through coulomb collisions. Many electron-hole pairs are formed in the crystal as a result of the energy deposited by each gamma ray photon. The recombination of the holes in the electrons then creates a large number of low energy scintillation photons. Measurements have shown that for a sodium iodide scintillation crystal, 11.4-13.5% of the total energy from the absorbed energy is emitted as scintillation photons.

The scintillation photons are emitted in random directions by the crystal. Those photons striking the light reflective surface are reflected back towards the photomultiplier tubes so that for each gamma ray absorption, photons are emitted in a conical pattern towards the photomultiplier tubes with a higher concentration of the photons in the center of the cone. These photons are detected by the photomultiplier tubes and, for best position resolution of the gamma ray absorption, the photons should strike at least seven photomultiplier tubes. Well known electronic circuitry is then employed to determine the position of the gamma ray absorption from the output signals of the photomultiplier tubes.

These previously known gamma ray imaging detectors, however, suffer from a number of disadvantages. One disadvantage is that the sodium iodide crystal generates only a relatively small number of scintillation photons per absorbed gamma ray. For example, assume that the incoming gamma ray has an energy of 140 keV which is the energy of the $^{99m}T_c$ decay commonly used in nuclear medicine applications. Absorption of such a gamma ray by the sodium iodide crystal would generate about 5,300 photons with a standard deviation according to Poisson statistics of 73 photons. Thus, for such a gamma ray, $5,300 \pm 73$ total photons are emitted per gamma ray absorption in a spectrum centered about 415 nanometers which is in the bluish-green visible range.

The scintillation photons travel radially outward from the point of absorption in random directions. The photons travelling towards the photomultiplier tubes are refracted at the crystal/light pipe interface due to a mismatch in the refractive indices for sodium iodide ($N=1.85$) and glass ($N=1.5$). As previously described, still other photons reflected from the light reflective surface on the anterior side of the crystal so that the photons form a cone of light exiting the crystal/light pipe assembly and having a diameter larger than the diameter of a single photomultiplier tube. Furthermore, for best results, the cone of light exiting the light pipe assembly produces signals in at least seven photomultiplier tubes, i.e. the center and six nearest photomultiplier tubes. In the well known fashion, the magnitude of the signal from each photomultiplier tube is proportional to the number of photoelectrons produced in each photomultiplier tube. These seven signals are then combined to provide a two dimensional position signal indicative of the point of the gamma ray absorption. Digital corrections are then made to the position signal to correct non-linearities and component variations.

Not all of the photons which strike the photomultiplier tubes generate a photoelectron from the photocathode. Instead, the quantum efficiency of the photomultiplier tube is expressed as a percentage, i.e. the percentage of the number of photons striking the photomultiplier tubes which generate a photoelectron from the photocathode. The quantum efficiency for a photomultiplier tube having a bialkalide photocathode is typically about 15-30% when averaged over the emission spectra of common scintillators.

The two most important intrinsic performance characteristics of the previously known gamma ray imaging detectors are the intrinsic spatial resolution and the intrinsic energy resolution. The previously known gamma ray detectors are capable (when measured using 140 keV gamma rays) of about 4 mm full width at half maximum (FWHM) intrinsic spatial resolution and 9.5-12% FWHM energy resolution for 140 keV gamma rays. Furthermore, these two parameters dominate the performance characteristics of the previously known gamma ray detectors.

For example, the energy resolution of a 140 keV gamma ray absorption by the previously known sodium iodide (Tl) crystal is dominated by Gaussian statistics. Application of the Gaussian statistical model reveals that one standard deviation equals the square root of the mean number of photoelectrons produced per gamma ray absorption. Assuming that the energy resolution is 10% FWHM, then a single standard deviation is equal to 4.25% and the mean number of photoelectrons produced per gamma ray absorption is 552. Consequently, for the 5,300±73 photons emitted per gamma ray absorption, and assuming that the quantum efficiency of the multiplier tube is 20-22%, only about half of the scintillation photons created during the gamma ray absorption actually reach the photocathodes of the photomultiplier tubes.

These previously known gamma cameras suffer from a number of disadvantages. One disadvantage of these previously known cameras is the inability to accurately discriminate between "good events" and "bad events". A good event, of course, is a gamma ray which passes directly from the isotope during radioactive decay through the collimator and to the sodium iodide crystal. "Bad events", on the other hand, are gamma rays which are scattered before reaching the camera as well as other incident gamma rays.

In order for the gamma ray camera to differentiate between "good events" and "bad events", it is necessary to establish an energy window or criteria for the photomultiplier tubes in order to differentiate between good and bad events. Thus, gamma ray absorptions which fall within the energy window are considered to be "good events" while events which fall outside the energy window are considered to be "bad events" and are not processed.

The previously known gamma cameras utilizing photomultiplier tubes and sodium iodide crystals, however, necessitate a relatively wide energy window or energy acceptance criteria. This relatively wide energy window which is necessitated by the 9.5-12% FWHM energy resolution is due in large part to the relatively low photoelectron yield of sodium iodide scintillation light when coupled with the low quantum efficiency of the photomultiplier tubes and the refractive index mismatch between the crystal and the light pipe previously discussed. Consequently, some "bad events" are erroneously accepted as "good events" since the bad event nevertheless falls within the relatively broad energy window or acceptance criteria. All of this detracts from the imaging clarity, accuracy and capability of the gamma camera.

It is not possible or practical with these prior art devices to simply narrow the energy acceptance criteria to eliminate the erroneous acceptance and processing of bad events since, to do so, would undesirably eliminate processing of many "good events" due to the intrinsic energy resolution of the NaI(Tl) crystal.

A still further disadvantage of these previously known gamma cameras is that the sodium iodide crystals must be hermetically sealed by the manufacturer in order to protect the crystal from humidity absorption. The sodium iodide crystals are also brittle and can be easily fractured by temperature or thermal shock.

SUMMARY OF THE PRESENT INVENTION

The present invention discloses a gamma ray imaging detector or gamma ray camera which improves upon all of the above mentioned disadvantages of the previously known devices.

In brief, the present invention discloses a gamma camera which utilizes a cesium iodide crystal doped with thallium (CsI(Tl) crystal) in place of the sodium iodide crystal as the scintillating detector crystal. As before, a collimator is placed between the gamma ray source and the crystal while a light reflective surface overlies one side of the crystal.

In lieu of the photomultiplier tubes utilized by the previously known gamma ray cameras, the present invention utilizes low noise solid state photodiodes which detect and generate an output signal in proportion to the number of photons absorbed by the photodiodes. At present low capacitance photodiodes, such as silicon drift photodiodes, are utilized to detect the photons emitted as a result of the gamma ray absorption by the CsI(Tl) crystal.

It is understood that the term "photodiode" used subsequently in this disclosure refers to devices fabricated from semiconductor or semi-insulator materials and variously described in scientific literature as "semiconductor photodiode", "solid state photodiode", "semiconductor photodetector", or the like.

The output signals from the photodiodes are then amplified and processed in a manner similar to the previously known gamma ray cameras.

As will be subsequently described in greater detail, the CsI(Tl) crystal has a higher scintillation photon yield than a sodium iodide crystal which is thallium doped (NaI(Tl) crystal). More specifically, the CsI(Tl) crystal has a scintillation photon yield of 51,500 photons/MeV versus 37,700 photons/MeV for a NaI(Tl) crystal. The CsI(Tl) crystal also generates photons having an average wavelength of approximately 580 nanometers, which is in the red light spectrum, as opposed to 415 nanometers for NaI(Tl) crystal which lies in the blue or blue-green light spectrum for visible light.

Low noise photodiodes such as silicon drift photodiodes have a relatively high quantum efficiency for the spectrum centered at 580 nanometers of approximately 75%. That high quantum efficiency, coupled with the increased scintillation photon yield for CsI(Tl) crystal versus NaI(Tl) crystal results in a detectable signal approximately 4.1 times higher per incident gamma ray than the previously known devices. Since the energy resolution is proportional to the square root of the total number of quanta detected, the energy resolution is capable of improvement by a factor of two.

Despite the higher scintillation photon yield for the CsI(Tl) crystal versus NaI(Tl) crystal, there has been no motivation to substitute a CsI(Tl) crystal as the scintillation crystal for tho previously known NaI(Tl) crystal. This is because photomultiplier tubes are less sensitive to the reddish light emitted by CsI(Tl) crystal versus the bluish-green light emitted by NaI(Tl) crystal as a result of a gamma ray absorption. Consequently, even though more photons are emitted as a result of a gamma ray absorption by a CsI(Tl) crystal than by a NaI(Tl) crystal, fewer photons are detected by photomultiplier tubes from the CsI(Tl) crystal than from the NaI(Tl) crystal since the photomultiplier tubes have approximately 20% efficiency for bluish-green light versus 10% efficiency for reddish light.

Following detection of the photons by the photodiodes, the outputs from the photodiodes are amplified and processed by conventional circuitry to determine a position signal indicative of the point of gamma ray absorption.

The use of a CsI(Tl) crystal coupled with photodiodes provide both enhanced spatial and energy resolution than the previously known gamma ray cameras.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
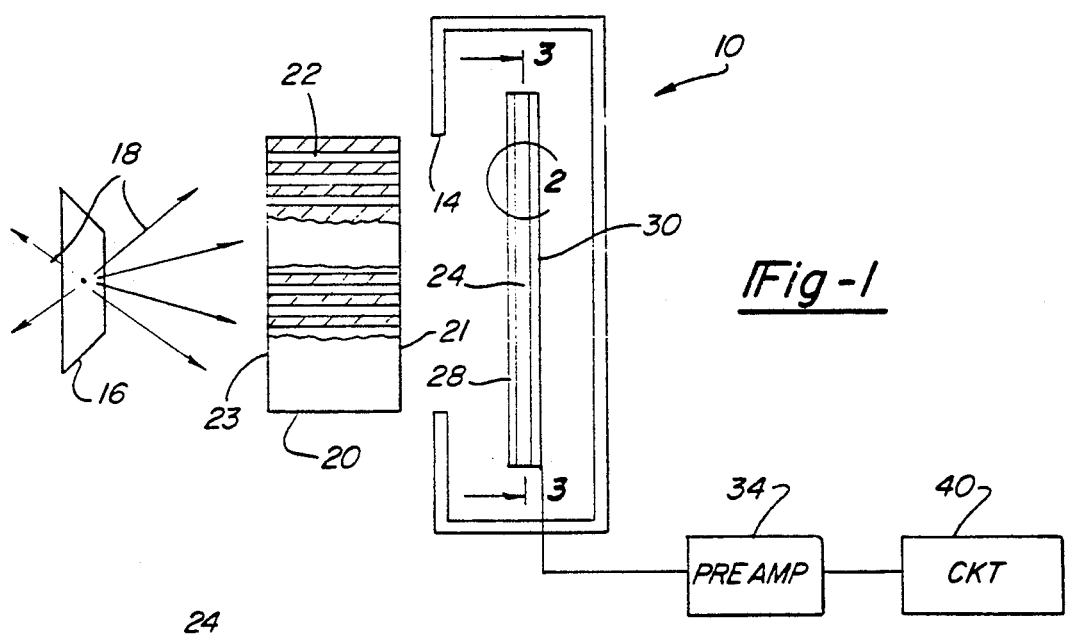
FIG. 1 is a diagrammatic view illustrating a preferred embodiment of the present invention.

With reference first to FIG. 1, a preferred embodiment of the gamma ray detector or gamma camera 10 of the present invention is thereshown which is particularly suited for nuclear medicine applications. The gamma ray camera 10 includes a housing 12 with an entrance window 14 for the gamma rays.

Typically, a radioactive isotope is injected or otherwise introduced into the specimen 16 under investigation. Consequently, during radioactive decay of the radioactive isotope, the isotope generates gamma rays 18 in random directions.

In the well known fashion, a collimator 20 is positioned in between the specimen 16 and the entrance window 14 of the gamma ray camera 10. The collimator 20 is typically constructed of lead and includes a plurality of pg,12 parallel throughbores 22 formed through it which are open on one side 21 to the entrance window 14 and on its opposite side 23 to the specimen 16. The collimator 20 ensures that gamma rays which pass through it from the specimen 16 to the entrance window 14 of the camera 10 are substantially parallel to each other.

Figure 2:
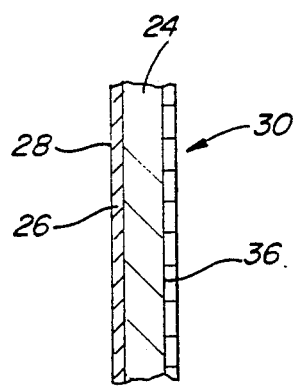
FIG. 2 is a fragmentary sectional view taken along circle 2 in FIG. 1.

With reference now to FIGS. 1 and 2, a thallium doped cesium iodide CsI(Tl) crystal 24 is contained within the housing 12 behind the entrance window 14 and so that one side 26 of the crystal 24 is substantially perpendicular to the gamma rays entering the window 14. Additionally, a light reflective surface 28 overlies one surface of the crystal 24, such as the anterior surface of the crystal 24.

Although a CsI(Tl) crystal is the preferred scintillation material, other scintillation materials can also be used. However, it is preferred that the scintillation material emit scintillation photons with a spectral distribution for which most of the scintillation photons have a wavelength longer than 475 nanometers to facilitate a good match with the photodiode spectral sensitivity.

Figure 3:
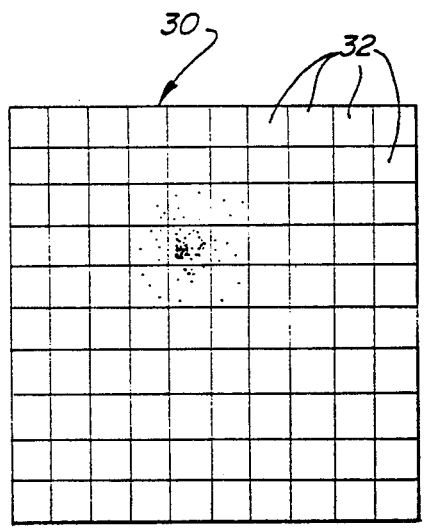
FIG. 3 is a diagrammatic view taken along line 3—3 in FIG. 1 and enlarged for clarity.

Referring now particularly to FIGS. 1-3, an array 30 of photodiodes 32 with associated preamplifiers 39 overlies the side 36 of the crystal 24 opposite from the light reflective layer 26. As best shown in FIG. 2, the photodiode array 30 may be applied directly to the scintillation crystal 24. Alternatively, however, a light pipe constructed of any conventional material, such as borosilicate glass, plastic or the like may be used.

Alternatively, the photodiodes 32 can be mounted on the anterior side of the crystal 24.

The photodiodes 32 must have a high quantum efficiency for the spectrum of scintillation light produced by the scintillation crystal 24 as a result of gamma ray absorption. Additionally, the photodiodes must have a low noise with respect to the signal which the photodiode produces as a result of the photons received. This is particularly critical since, in the present invention, as few as 25 photons per event should be received and detected by the photodiode.

In practice, the total noise in equivalent electrons generated in all of the photodiodes which receive scintillation photons during a single event, including their associated preamplifiers 39, over the time in which the scintillation photons are collected is less than the total number of scintillation photons producing electron-hole pairs in the photodiode area during a single event or gamma ray collection.

One photodiode which meets the criteria necessary for the gamma camera of the present invention is a silicon drift photodiode. The drift photodiode has a relatively large light collection area and a small electrical capacitance. In operation, electrons drift along fairly long distances within the wafer parallel to the wafer surface. Because of their specific configuration, the capacitance of the device is much lower than using conventional diodes.

In the preferred form of the invention, the capacitance of each photodiode is less than 10.0 picofarads and preferably less than 2.0 pF. Even smaller capacitances, such as 0.1 pF, are achievable with silicon drift photodiodes.

Conventional circuitry 40 (FIG. 1) both amplifies and processes the signals from the photodiode array 30 in order to generate the desired position coordinates for the gamma ray absorption event. Such circuitry is well within the capability of those having ordinary skill in this field so that a further description thereof is unnecessary. However, since the scintillation decay time for the CsI(Tl) crystal is about 900 ns and thus about four times longer than the 230 ns decay time for the NaI(Tl) crystal, appropriate modification of the processing circuitry will be required.

In practice, the CsI(Tl) scintillation crystal generates approximately 51,500 photons/MeV. Assuming a 140 keV incident gamma ray, then about 7,200 scintillation photons are produced as a result of absorption by the scintillation crystal. As is standard for gamma ray cameras, approximately 50% of the scintillation photons are collected by the photodiodes.

Assuming a 75% quantum efficiency, the total number of photons received by the photodiodes which produce an output signal by the photodiodes equals 2,700 ($7,200 \times 0.5 \times 0.75$). This is in sharp contrast to the 552 mean number of detected photons for the previously known gamma ray cameras with a NaI(Tl) crystal for a like event.

Using Gaussian statistics, the gamma camera of the present invention has a standard deviation of 1.9% which translates to an energy resolution of 4.5% FWHM, assuming negligible noise. Assume that the event is detected by seven photodiodes and that each photodiode has a noise equivalent to 50 electrons per diode over the necessary charge integration time. Then the detected charge from the photodiode array 30 would be 2700+7×50=3050 electrons. The standard deviation (σ) of the new signal would then be the square root of 3050+350 or 58.3.

The standard deviation of the new signal (58.3) divided by the number of detected electrons (2,700) yields a standard deviation for the noise level of 2.2%. The FWHM is then determined by multiplying the standard deviation of the noise level (2.2%) by 2.35 thereby yielding an energy resolution of 5.1% FWHM.

A more realistic case would be to assume that the scintillation photons are detected by 19 diodes 37 of the photodiode array 30 due not only to the close packing of the diodes 32 but also their close proximity to the crystal 24. In that event, the energy resolution using the above calculation would be 5.9% FWHM. Consequently, this is an improvement of approximately a factor of two in the energy resolution for a comparable previously known gamma ray camera using photomultiplier tubes and NaI(Tl) crystal as the scintillation crystal.

The inclusion of an avalanche region within the silicon drift photodiode may also enhance the performance of the photodiode and the energy resolution of the gamma ray detector. Such avalanche diodes produce a gain in collected charge such that the electronic noise component of the photodiode may become negligible. This in turn would further enhance the energy resolution of the device.

The intrinsic spatial resolution of the device is also dependent upon the precision of the signals of the individual elements used to estimate the centroid of the photon distribution. Since the number of detected photons is approximately four times the number of detected photons of the previously known gamma cameras, the spatial resolution for the camera should also improve just as was shown for the energy resolution.

The increased number of photons detected by the photodiode array 30 as a result of a gamma ray absorption results in the improved energy resolution which in turn allows more stringent criteria to be applied to the output from the photodiodes to discriminate against "good events" versus "bad events".

In addition to the increased energy and spatial resolution of the gamma ray camera of the present invention, the camera of the present invention also allows several other advantages unobtainable by the previously known devices. More specifically, the photodiode array is not subject to influence by magnetic fields unlike photomultiplier tubes. This in turn eliminates the necessity to employ magnetic shielding of the type used with the previously known cameras. Indeed, the photodiode arrays are not influenced by magnetic fields which are many times stronger than the Earth's magnetic field.

A still further advantage of the present invention is that photomultiplier tubes are large and bulky. In sharp contrast to this, the photodiode array 30 is very thin and will greatly reduce the size of the device and, consequently, the shielding required to surround it. Similarly, relatively low voltage power supplies are capable of powering the photodiode array 30 as opposed to high voltage supplies for photomultiplier tubes.

The use of the CsI(Tl) crystal as opposed to the previously used NaI(Tl) crystal is also advantageous in several respects. More specifically, the CsI(Tl) crystal is able to withstand both higher thermal and mechanical shock without damage than the previously known NaI(Tl) crystals. Furthermore, since the CsI(Tl) crystal has a much lower hygroscopic nature than sodium iodide crystals, hermetic sealing of the crystal may not be required.

Although the scintillation crystal 24 has been referred to as a single crystal, this simply means that a plurality of photodiodes are arranged to receive scintillation photons from a single scintillation crystal. In practice, the gamma ray camera may include more than one crystal with each crystal having its own photodiode array.

Having described our invention, however, many modifications thereto will become apparent to those skilled in the art to which it pertains without deviation from the spirit of the invention as defined by the scope of the appended claims.

We claim:

1. A gamma ray imaging detector for gamma rays having an energy of substantially 140 KeV comprising:
   a scintillation detector crystal for converting incident gamma rays to a plurality of scintillation photons upon collection of the gamma ray, said gamma ray having an energy of substantially 140 KLeV, said crystal emitting scintillation photons with a spectral distribution for which most of the scintillation photons have a wavelength longer than 475 nanometers,
   an array of photodiodes and associated preamplifiers, said photodiodes being arranged to receive said scintillation photons and to generate an electrical output signal proportionate to the number of scintillation photons received.
   means responsive to said output signals from said photodiodes for determining the position of absorption on the crystal of the incident gamma ray.
   wherein said photodiodes are dimensioned so that said scintillation photons from a single incident gamma ray impinge upon a plurality of photodiodes, and
   wherein said photodiodes are low electrical noise photodiodes such that the total electrical noise in equivalent electrons generated in all of the photodiodes which receive scintillation photons during a single event, including their associated preamplifiers, over the time in which the scintillation photons are collected is less than the total number of scintillation photons producing electron-hole pairs in the photodiode area during a single event or gamma ray collection of a gamma ray having an energy of substantially 140 KeV,
   wherein said photodiodes have a capacitance of less than 10 picofarads.

2. The invention as defined in claim 1 wherein said scintillation crystal consists essentially of a thallium doped cesium iodide crystal.

3. The invention as defined in claim 1 wherein said photodiodes have a capacitance less than 2.0 picofarads.

4. The invention as defined in claim 2 wherein said photodiodes are silicon drift photodiodes.

5. The invention as defined in claim 1 wherein said photodiodes are avalanche photodiodes.

6. The invention as defined in claim 1 wherein said photodiodes are a hybrid of drift and avalanche photodiodes.

7. The invention as defined in claim 1 wherein said crystal is a single crystal and wherein said photodiodes are mounted directly to a first surface of said crystal.

8. The invention as defined in claim 5 wherein a light reflective layer overlies a second surface of said crystal.

9. A gamma ray imaging detector comprising:

a scintillation detector crystal for converting incident gamma rays to a plurality of scintillation photons upon collection of the gamma ray, said crystal emitting scintillation photons with a spectral distribution for which most of the scintillation photons have a wavelength longer than 475 nanometers, an array of photodiodes and associated preamplifiers, said photodiodes being arranged to receive said scintillation photons and to generate an electrical output signal proportionate to the number of scintillation photons received, means responsive to said output signals from said photodiodes for determining the position of absorption on the crystal of the incident gamma ray, wherein said photodiodes are dimensioned so that said scintillation photons from a single incident gamma ray impinge upon a plurality of photodiodes, and wherein said photodiodes have a capacitance of less than 10 picofarads.

10. The invention as defined in claim 9 wherein said scintillation crystal consists essentially of a thallium doped cesium iodide crystal.

11. The invention as defined in claim 9 wherein said photodiodes have a capacitance of less than one picofarad.

12. The invention as defined in claim 9 wherein said photodiodes are silicon drift photodiodes.

13. The invention as defined in claim 9 wherein said photodiodes are avalanche photodiodes.

14. The invention as defined in claim 9 wherein said crystal is a single crystal and wherein said photodiodes are mounted directly to a first surface of said crystal.

15. The invention as defined in claim 14 wherein a light reflective layer overlies a second surface of said crystal.

16. The invention as defined in claim 9 wherein said photodiodes are a hybrid of drift and avalanche photodiodes.

* * * * *

UNITED STATES PATENT AND TRADEMARK OFFICE
CERTIFICATE OF CORRECTION

PATENT NO.  :   5,171,998
DATED       :   December 15, 1992
INVENTOR(S) :   John C. Engdahl and Glenn F. Knoll It is certified that error appears in the above-identified patent and that said Letters Patent is hereby corrected as shown below:

Column 4, line 57, "tho" should read --the--.

Column 8, claim 1, line 21, "KLeV" should read --KeV--.

Signed and Sealed this

Second Day of November, 1993

Attest:

BRUCE LEHMAN

Attesting Officer    Commissioner of Patents and Trademarks